US009025520B2

(12) United States Patent
Kim et al.

(10) Patent No.: US 9,025,520 B2
(45) Date of Patent: May 5, 2015

(54) APPARATUS SUPPORTING AN MBMS SERVICE

(75) Inventors: Jae Heung Kim, Daejeon (KR); Kyoung Seok Lee, Daejeon (KR); Kook Jin Lee, Daejeon (KR); Jae Young Ahn, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 206 days.

(21) Appl. No.: 13/265,917

(22) PCT Filed: Apr. 23, 2010

(86) PCT No.: PCT/KR2010/002576
§ 371 (c)(1),
(2), (4) Date: Oct. 24, 2011

(87) PCT Pub. No.: WO2010/123319
PCT Pub. Date: Oct. 28, 2010

(65) Prior Publication Data
US 2012/0039233 A1     Feb. 16, 2012

(30) Foreign Application Priority Data

Apr. 23, 2009   (KR) .................. 10-2009-0035375
Aug. 3, 2009    (KR) .................. 10-2009-0071323

(51) Int. Cl.
*H04W 72/12*     (2009.01)
*H04W 72/00*     (2009.01)
*H04W 72/04*     (2009.01)

(52) U.S. Cl.
CPC .......... *H04W 72/005* (2013.01); *H04W 72/042* (2013.01)

(58) Field of Classification Search
USPC ........ 370/310, 312, 328, 329, 390, 431, 432; 455/3.01, 3.04, 3.06, 450, 422.1
See application file for complete search history.

(56) References Cited

U.S. PATENT DOCUMENTS

| 8,249,007 | B2* | 8/2012 | Jading et al. .................. 370/329 |
| 2005/0020260 | A1 | 1/2005 | Jeong et al. |
| 2006/0067361 | A1* | 3/2006 | Lee et al. ...................... 370/466 |
| 2007/0218929 | A1 | 9/2007 | Kuo |
| 2008/0081598 | A1* | 4/2008 | Chandra et al. ............ 455/414.1 |
| 2008/0253322 | A1* | 10/2008 | So et al. ........................ 370/329 |
| 2008/0293399 | A1 | 11/2008 | Xu et al. |

(Continued)

FOREIGN PATENT DOCUMENTS

| KR | 1020050047439 | 5/2005 |
| KR | 20080018148 A | 2/2008 |

(Continued)

OTHER PUBLICATIONS

International Search Report for Application No. PCT/KR2010/002576, dated Nov. 23, 2010.

*Primary Examiner* — Curtis A Alia
(74) *Attorney, Agent, or Firm* — Nelson Mullins Riley & Scarborough LLP; Anthony A. Laurentano, Esq.

(57) ABSTRACT

Provided is a method and apparatus that may control a configuration and operation of a network including a base station to support a multicast and broadcast multimedia service in a cellular system and may control an operation of a terminal and the like, and thus, may effectively provide a multimedia service in the cellular system.

9 Claims, 8 Drawing Sheets

(56) References Cited

U.S. PATENT DOCUMENTS

2009/0046617 A1* 2/2009 Tenny et al. ............ 370/312
2009/0061914 A1* 3/2009 Cai ......................... 455/466
2009/0296645 A1* 12/2009 Bui .......................... 370/329
2011/0069667 A1* 3/2011 Grovlen et al. ......... 370/329

FOREIGN PATENT DOCUMENTS

| KR | 20080019160 A | 3/2008 | |
| WO | WO 2008084634 A1 * | 7/2008 | |
| WO | WO 2008135853 A1 * | 11/2008 | H04B 7/26 |

* cited by examiner

APPARATUS SUPPORTING AN MBMS SERVICE

This application is a 35 U.S.C. §371 filing of International Application Number PCT/KR2010/002576 which was filed on Apr. 23, 2010, and which claims priority to, and the benefit of, Korean Application Nos. 10-2009-0035375, filed on Apr. 23, 2009; 10-2009-0071323, filed on Aug. 3, 2009. The contents of the aforementioned applications are hereby incorporated herein by reference.

TECHNICAL FIELD

The present invention relates to a configuration and an operation of a network including a base station for supporting a multicast and broadcast multimedia service in a cellular system, and relates to a method of controlling an operation of a terminal.

BACKGROUND ART

The present invention may provide a configuration and an operation of a network including a base station to support a multimedia broadcasting and multicast service, for example, an Multimedia Broadcast Multicast Service (MBMS), in addition to a voice service and a data service in a cellular system for providing a packet service, and may provide a method and a process of controlling an operation of a terminal. The MBMS may fixably allocate a common channel to provide a service in a conventional circuit-based cellular system.

A conventional Third Generation Partnership Project (3GPP)-based cellular system may apply a code division multiple access (CDMA) scheme, and may provide MBMS using a secondary common control physical channel (S-CCPCH) that reserves and allocates several codes for the MBMS. A 3GPP Wideband CDMA (WCDMA) system that is based on an asynchronous mode may support an MBMS Single Frequency Network (MBSFN) function, and may control a synchronization of a downlink physical channel and thus, may improve a radio link channel through a soft combining function and a selective combining function between multiple routes in the terminal.

The conventional WCDMA system may classify, into various states, the base station and the terminal for exchanging information such as traffic and the like to apply different operation processes for the information exchange according to the state of the terminal. The state of the terminal may briefly classified into an idle mode and an active mode, and the active mode is classified into more detailed states such as URA_PCH, CELL_PCH, CELL_FACH, and CELL_DCH to control the operation of the terminal. A radio network for providing a service, namely, a service network, may be constituted by network nodes such as a user equipment (UE), a node B, a radio network controller (RNC), a General Packet Radio Service support node (GSN), and the like.

A Long Term Evolution (LTE) system may be a packet-based system, may be a system for providing packet service, and may provide various packet services, such as a Internet Protocol based voice service, a game service, a file Transfer Protocol (FTP) service, a Video streaming service, a Multicast or Broadcast service, and the like. To perform the above, the service network is simply constituted by a terminal, a base station or cell, an access Gateway (aGW) that is an end point of the network, and the like, and the state of the base station and the terminal is simply classified into two states, such as RRC_IDLE and RRC_CONNECTED. The LTE system may adopt an Orthogonal Frequency Division Multiple (Access) (OFDM(A)) as a multiple access scheme, and thus, a radio resource allocation is switched into a two-dimensional (2D) allocation based on a frequency and time, as opposed to a code allocation.

Accordingly, the LTE system may use a method of effectively providing the Multicast or Broadcast Service by applying a various base station environments including a hierarchical cell format, a controlling method based on an operation of a terminal, and a scheme of generating and transmitting of control information that allocates variable radio resources.

DISCLOSURE OF INVENTION

Technical Goals

An aspect of the present invention effectively provides a multicast and a multimedia service in a cellular system.

Technical Solutions

According to an aspect of an exemplary embodiment, there is provided a terminal, and the terminal includes a control information receiving unit to receive information associated with multicast resource allocation from a base station, and to receive multicast control information based on the information associated with the multicast resource allocation, and a receiving unit to receive multicast data from the base station based on the multicast control information.

According to another aspect of an exemplary embodiment, there is provided a base station, and the base station includes a control information transmitting unit to transmit, to a terminal, information associated with multicast resource allocation, and to transmit, to the terminal, multicast control information based on the information associated with the multicast resource allocation, and a data transmitting unit to transmit multicast data to the terminal based on the multicast control information.

According to still another aspect of an exemplary embodiment, there is provided a terminal, and the terminal includes a control information receiving unit to receive control information associated with multicast data from a base station, a controller to determine, based on the control information, a time duration where the multicast data is transmitted in the data frame, a transmitting unit to transmit, based on the control information, a join request message with respect to the multicast data to the base station, and a receiving unit to receive multicast data that the base station multicasts during the time duration in response to the join request message.

Effect

According to the present invention, a multicast and multimedia broadcast service may be effectively supported in a cellular system.

BEST MODE FOR CARRYING OUT THE INVENTION

Figure 1:
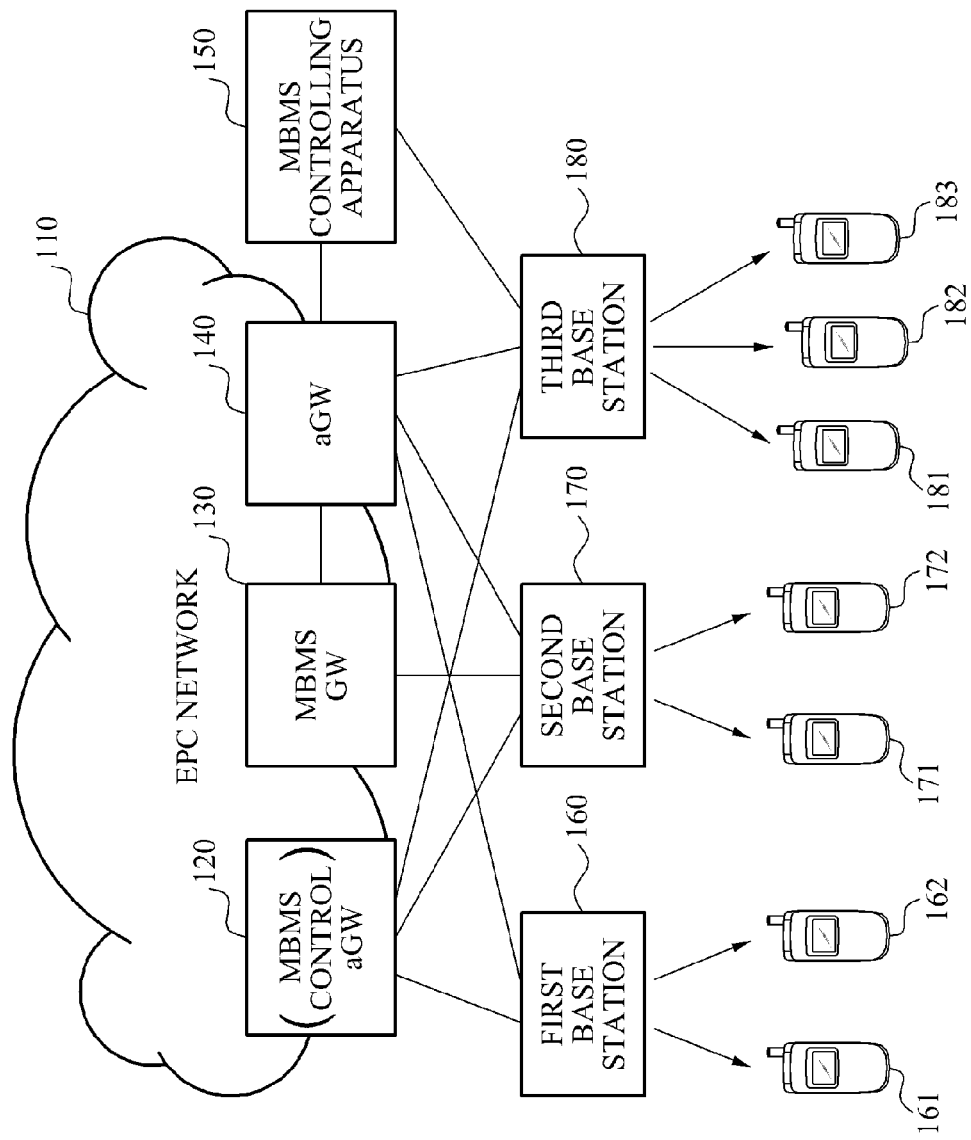
FIG. 1 illustrates a configuration of a cellular system providing a multimedia broadcast and multicast service.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a configuration of a cellular system providing a multimedia broadcast and multicast service. The multimedia broadcast and multicast service (hereinafter MBMS) may be configured in a radio network composing the cellular system as illustrated in FIG. 1. Base stations 160, 170, and 180 may access an Evolved Packet Core (EPC) network 110 that is a network of a packet-based cellular system. The base stations 160, 170, and 180 may access the EPC network through an access gateway (aGW) 120. Terminals 161, 162, 171, 172, 181, 182, and 183 may access a cellular network via the base stations 160, 170, and 180.

The terminals 161, 162, 171, 172, 181, 182, and 183 may access an MBMS GW 130 via the base stations 160, 170, and 180. The MBMS GW 130 is a gateway to provide an MBMS.

According to an embodiment, a controlling function to support the MBMS may be placed in the aGW 120 or the base stations 160, 170, and 180. According to another embodiment, the controlling function to support the MBMS may be placed in an MBMS controlling apparatus 150 that is connected to the EPC network 110 via a separate interface. According to still another embodiment, the controlling function to support the MBMS may be scattered to be placed in aGWs 120 and 140, and the base stations 160, 170, and 180.

The MBMS controlling apparatus 150 to support the MBMS may manage the controlling function for supporting an MBMS data traffic and service, and may manage a radio resource allocating and scheduling function with respect to the base stations 160, 170, and 180 that join an MBSFN operation. Accordingly, the base stations 160, 170, and 180 may determine a modulation and coding level for MBSFN transmission according to controlling of an MBMS control function.

Figure 2:
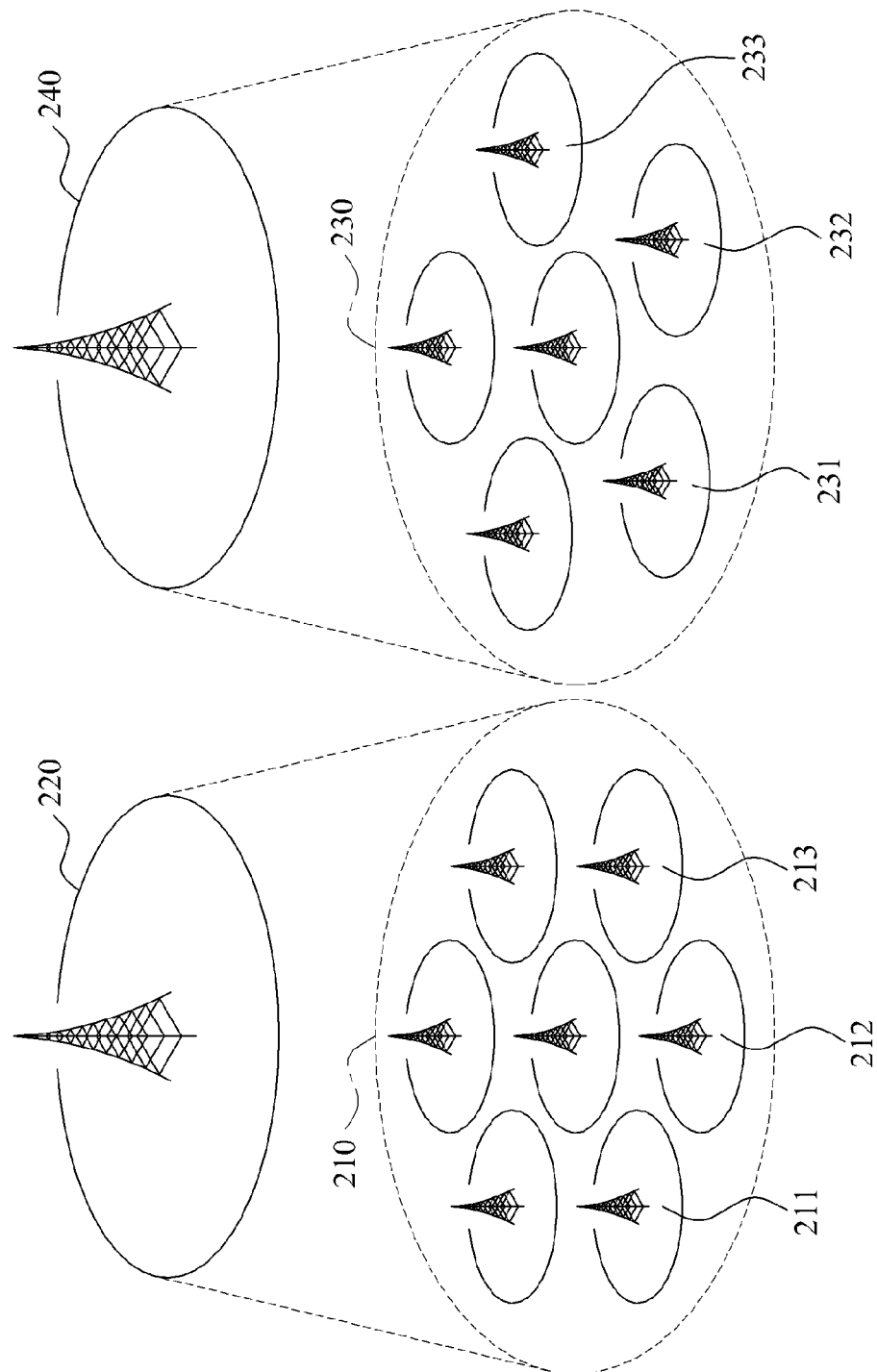
FIG. 2 is a diagram illustrating a cellular base station environment to support an MBMS.

FIG. 2 illustrates a cellular base station environment to support an MBMS.

A cellular system may transmit an MBMS based on a hierarchical base station environment. The MBMS may be supported. In the cellular system, a base station may be classified into an MBMS-dedicated base station, a combination service base station supporting both the MBMS and a unicast service, a general base station that does not support the MBMS, and the like.

An OFDM or OFDMA-based cellular system may perform an MBMS single Frequency Network (MBSFN) operation for the MBMS to improve performance with respect to terminals in a cell boundary area. The MBSFN operation may be a method where a plurality of base stations overcomes deterioration in a performance due to a wireless environment, such as interference and the like, to effectively provide the MBMS to terminals in the cell boundary area.

To perform the MBSFN operation, base stations included in the same MBSFN area may transmit the same MBMS information in the same modulation and coding level based on a predetermined transmission frequency band or carrier during a predetermined scheduling period or a transmission time. Terminals in the MBSFN area may receive packet information for the MBMS from a plurality of cells, may obtain a diversity gain, and may satisfy a desired service quality of the system, and thus, may receive the MBMS even in a poor radio channel environment.

According to another embodiment, a single base station may provide the MBMS, which is referred to as a single cell transmission. In this case, a terminal located in an area of a predetermined base station may receive an MBMS only from the corresponding base station. Therefore, a reception performance in a cell boundary area may be deteriorated. In this case, the base station supporting the MBMS may prevent a performance deterioration through a repetitive transmission or a separate modulation and coding scheme.

FIG. 2 illustrates a hierarchical base station environment for supporting the MBMS. All base stations 220 and 240 in a second layer may be MBMS-dedicated base stations. Base stations 210, 211, 212, 213, 230, 231, 232, and 233 in a first layer may be composed of MBMS base stations in an MBSFN mode, single cell MBMS transmission base stations, and general base stations, and the like. The general base station may only provide a unicast service.

The base stations 220 and 240 in the second layer may constitute the MBSFN area, or the base stations 220 and 240 in the second layer may provide the MBMS to a broad area using only their MBMS-dedicated base stations.

Service areas of the MBMS-dedicated base stations 220 and 240 in the second layer may overlap with service areas of the base stations 210, 211, 212, 213, 230, 231, 232, and 233 in the first layer. Therefore, terminals corresponding to the base stations 210, 211, 212, 213, 230, 231, 232, and 233 in the first layer may receive transmission signals from the base stations 210, 211, 212, 213, 230, 231, 232, and 233 in the first layer and the base stations 220 and 240 in the second layer.

Depending on a capability of a terminal, the terminal may receive a transmission signal from a base station in a predetermined layer or may receive transmission signals from base stations in a plurality of layers. Therefore, a unicast or MBMS receiving method and procedure may be different depending on the capability of the terminal.

An area different from the MBSFN area may exist in the first layer. In the area different from the MBSFN, the MBMS may be provided only using a single base station, which is referred to as a single cell MBMS transmission. A service area of the base station performing the single cell MBMS transmission may or may not be overlapped with the service area of the MBMS-dedicated base station in the second layer.

According to another embodiment, the base stations in the first layer may constitute a first MBSFN area, and the base stations in the second layer may constitute a second MBSFN area. In this case, the first MBSFN area and the second MBSFN area may be overlapped with each other. The base stations in the second layer and the base stations in the first layer may constitute the same MBSFN area for the MBMS or may share or redundantly allocate a portion of a radio resource for the MBMS, to maintain a service continuity. The radio resource for the MBMS of an MBSFN mode may indicate a radio resource allocation area that is distinguished by a packet transmission time, such as a sub-frame on a time axis and the like, and a radio resource allocation area that distinguishes a transmission frequency, such as a sub-carrier on a frequency axis, a component carrier, a frequency band, and the like.

To receive the MBMS in the base station environment, the terminal may receive control information associated with the MBMS from the base station. Examples of the control information used for the MBMS may be as follows.
1. MBSFN frame and sub-frame allocation and configuration information
2. MBMS notification and indication information
   1) MBMS indicator to indicate whether MBMS is provided
   2) Information associated with MBSFN operation and change of MBMS Control Channel (MCCH)
3. MCCH configuration and scheduling information
   1) MBMS service identifier and MBMS session identifier
   2) Channel mapping information
   3) Control information based on terminal operation state
   4) Information associated with MBSFN
4. Information associated with a change of MCCH
   1) MCCH changing and repetition period
   2) MBMS start point or reference point
   3) MBMS session identifier
5. MBMS information
6. Information associated with MBMS of adjacent cell
   1) Information associated with adjacent cell in the same MBSFN
   2) Information associated with different MBSFN
7. Type or form of provided service
   1) Multicast and broadcast service (e.g., Multicast service, Broadcast service)
   2) Information associated with whether joining and release procedure is required In an LTE system of 3GPP, the base station may transmit, to the terminal, system information including environment and configuration information of the base station. The base station may transmit one portion of the system information using a broadcasting channel (BCH), and may transmit other portion of the system information using a downlink-shared channel to the terminal.

The base station may transmit one portion of the system information using a fixed transmission time and frequency resources and a predefined modulation and coding level through the BCH. According to another embodiment, the base station may transmit one portion of the system information according to a system information block (SIB) composing other portion of the system information at a predetermined transmission time. According to another embodiment, the base station may perform Cyclic Redundancy Check (CRC) masking of control information, for example, Physical Downlink Control Channel (PDCCH), with a separate scheduling identifier, for example, a System Information Radio Network Temporary Identifier (SI-RNTI), using dynamic allocation to transmit the CRC masked-control information, and may perform addressing radio resource allocation of the corresponding system information to transmit the radio resource allocation information.

The MBMS notification and indication information may include information associated with whether the corresponding base station provides an MBMS, information associated with an MBSFN operation, and the like, and may include information associated with a change of MCCH. The information associated with the change of MCCH may include a changing period of MCCH, a repetition period, a MBMS start point or reference point of MBMS, an MBMS identifier, an MBMS session identifier, and the like. According to an embodiment, the base station may configure the information associated with the change of MCCH separately from the MBMS notification and indication information. The information associated with the change of MCCH may only indicate a change of MCCH information, and the MBMS notification and identification information may configure a separate control message using only information associated with configuration of MBMS and transmission, such as radio resource allocation information associated with transmission, such as a configuration of MBMS and a radio resource allocation, and may transmit the control message.

According to an embodiment, the base station may not operate a separate notification or indication information to report the change of MCCH or the MBMS. In this case, the base station may set a changing period for the change of MCCH or may set a changing period for changing or correcting the MBMS. The base station may separate the changed MCCH information and the MCCH information that is not changed for each changing period to perform transmission. When the base station transmits the changed MCCH information together with the MCCH information that is not changed, the base station may separately transmit the changed MCCH information and the MCCH information that is not changed to enable the terminal to distinctively receive each of the information.

According to an embodiment, when the changing period set by the base station is greater than a 10-bit system frame number (SFN) defined by the system, the base station may enlarge the changing period using the SFN. The base station may express the changing period based on a 'modulo operation' using a separate identifier or based on a method of expressing the changing period as a multiple of an MBMS scheduling period.

According to another embodiment, a plurality of base stations included in an arbitrary MBSFN area or an arbitrary MBMS area may set the same changing period. In this case, the plurality of base stations may set the changing period using an identifier, such as an MBSFN frequency discriminator, a PLMN identifier, and the like, that may be shared by a plurality of base stations. According to an embodiment, base stations may set the changing period to be a multiple of an MBMS scheduling period.

According to another embodiment, each of base stations may set a different changing periods from each other. In this case, each of the base stations may set the changing period based on a physical cell identifier (PCI) or a base station unique identifier (cell ID). Each of the base stations may define a separate changing period frame offset to set the changing period. In this case, each of the base stations may use a multiple of an MBMS scheduling period and the changing period frame offset to express the changing period.

The MCCH control channel configuration and scheduling information may include control information associated with the MBMS. The control information associated with the MBMS may be transmitted from an MBMS controlling apparatus 150 outside the EPC network 110 of FIG. 1 or from the aGW 120. The control information associated with the MBMS may include at least one among information based on setting of a base station and scheduling information, the information based on the setting of the base station including channel mapping information for MCCH transmission, control information based on terminal operation state, MBSFN identifier information for an MBSFN operation or MBMS base station group identifier information, MBSFN area indication information or MBSFN boundary cell indication information, multi-antenna configuration information such as Multi Input Multi Output (MIMO), diversity, and the like, information associated with whether a layered coding transmission is supported, and the scheduling information including radio resource allocation information for MCCH transmission, MBMS service identifier or MBMS session identifier, radio bearer information, physical channel setting information for MBMS transmission, and the like.

The MBMS information may include, as information associated with MBMS data transmission, an MBMS service identifier, an MBMS session identifier, a data packet transmission duration and period, information associated with repetitive transmission, and the like.

The information associated with an MBMS of an adjacent cell may be information associated with a serving base station that a terminal accesses or a base station in which the terminal is camping, may be information associated with another adjacent base station or adjacent MBSFN area that is different from the serving base station and the base station in which the terminal is camping, and may include information associated with whether MBMS is provided and control information associated with the MBMS of a base station that provides an MBMS among other base stations included in different layers or the same layer where the serving base station, the base station in which the terminal is camping, and the adjacent base station, are included in. The information associated with the MBMS of the adjacent cell may include information associated with whether the MBMS is provided, information associated with MBSFN operation, information associated with a change of MCCH information, MCCH control channel configuration and scheduling information, and the like.

The information associated with whether the MBMS is provided may include information associated with whether the adjacent base station provides the MBMS, may include information associated with whether an arbitrary MBMS service is provided or may include MBMS service identifier information, for example, a service ID or a session ID.

The information associated with the MBSFN operation may include information associated with whether the adjacent base station supports the MBSFN mode, an MBSFN area identifier of when the MBSFN mode is supported, radio resource allocation information for transmission of the MBSFN, for example, information identifying an MBSFN transmission sub-frame, a sub-carrier, or component carrier.

The MCCH control channel configuration and scheduling information may include a changing period of MCCH information of the adjacent base station or the MBSFN area, a transmission sub-frame, radio resource allocation of MCCH, the radio resource allocation being used for a terminal to successfully receive the MCCH information, modulation and coding information, and the like.

A type or form information of a provided service may include joining and release information based on a form of the service in addition to information associated with whether the MBMS is in a form of a broadcast or in a form of a multicast.

Figure 3:
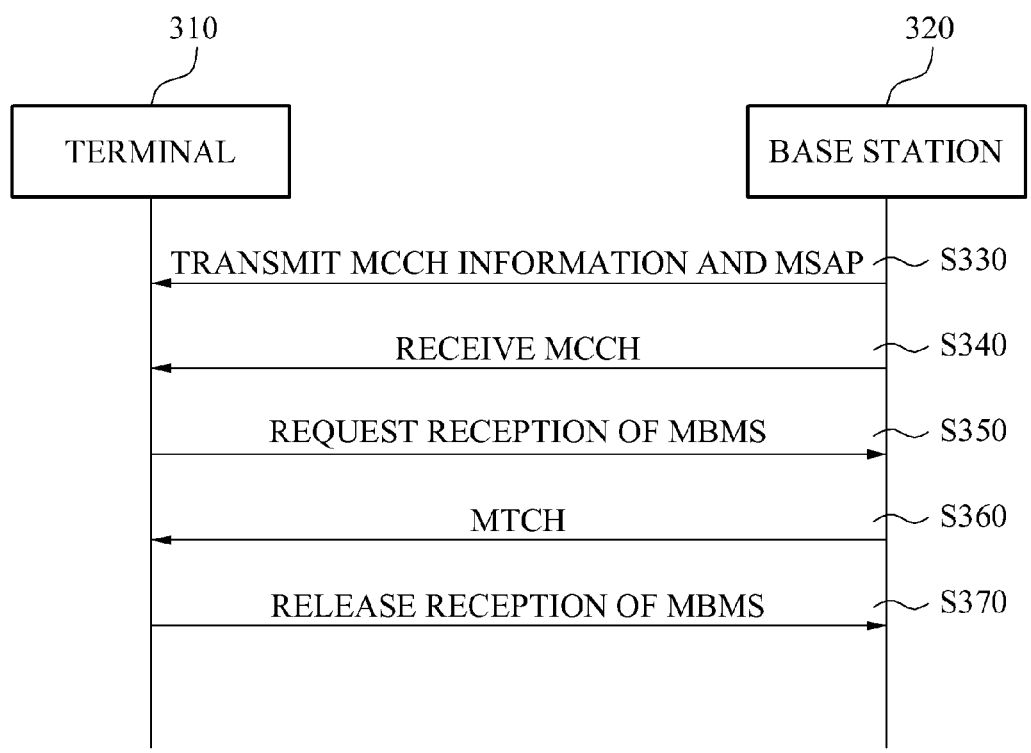
FIG. 3 is a diagram illustrating each operation of a method of supporting an MBMS.

FIG. 3 illustrates each operation of a method of supporting an MBMS.

In operation S330, a base station 320 transmits system information to a terminal 310 located in a coverage of the base station 320 using a broadcast channel that covers a total base station service area. The system information may include MCCH information and MBMS resource allocation pattern (MRAP) information. Here, the MCCH information may include radio resource allocation information that transmits an MCCH, and modulation and coding information associated with the MCCH. The MRAP information may be allocation information of the sub-frame which is commonly used by an arbitrary base station and base stations in an MBSFN area for transmission of the MBMS.

According to an embodiment, the base station may generate the MCCH information and the MRAP information. The base station may allocate a radio resource to support the MBMS, and generate information associated with the allocated radio resource to be in a form of a pattern to generate the information associated with the allocated radio resource as the MRAP information.

According to another embodiment, the aGW 120 or the MBMS controlling apparatus 150 of FIG. 1 may generate the MCCH information and the MRAP information, and the base station 320 may receive the MCCH information and the MRAP information from the aGW 120 or the MBMS controlling apparatus 150. In this case, the aGW 120 or the MBMS controlling apparatus 150 may generate the MCCH information or the MRAP information based on adjacent base stations or base stations included in the same MBSFN area. The aGW 120 or the MBMS controlling apparatus 150 may regard the adjacent base stations or the base stations in the same MBSFN area as an arbitrary group unit and may generate the MCCH information or the MRAP information based on the arbitrary group unit in a range where the aGW 120 or the MBMS controlling apparatus 150 is not closely connected to an MBSFN operation and does not affect on an MBSFN of MBMS data information, based on environment of base stations providing the MBMS.

According to an embodiment, the MRAP information may include an MBSFN frame and sub-frame allocation and configuration information. The MRAP information may include sub-carrier allocation information in a system bandwidth that is allocated by the base station to transmit MBMS information, control information, and the like, MBMS transmission radio frame information, and sub-frame information allocated in an MBMS transmission radio frame to transmit MBMS information.

According to an embodiment, information included in the MCCH information may be as follows.
  1. MCCH transmission radio resource location information
  2. Modulation and coding information for MCCH transmission
  3. Information associated with change of MCCH
    1) Start point of change of MCCH
    2) MCCH changing period
    3) MCCH repetition start point
    4) MCCH repetition period
    5) MCCH information transmission start point According to an embodiment, the MCCH transmission radio resource location information may indicate information associated with a predetermined frame or a predetermine sub-frame that transmits the MCCH among MRAP information. The information associated with the predetermined frame or the predetermined sub-frame that transmits the MCCH may be generated in a form of a pattern to be the MRAP information.

The modulation and coding information for transmission of the MCCH may be modulation and coding information with respect to an MCCH transmitted using an MCCH transmission radio resource.

The information associated with the change of the MCCH may include the start point of the change of MCCH, the MCCH changing period, the MCCH repetition start point, the MCCH repetition period, and the MCCH information transmission start point. The information associated with the change of the MCCH may be transmitted using a broadcast channel or using a system information block (SIB1), a system information block 2 (SIB2), and the like in 3GPP system information. Specifically, the base station 320 may transmit, to the terminal 310, the information associated with the change of the MCCH, using a pre-reserved transmission interval or time and a frequency resource and a predefined modulation and coding level.

When the base station 320 does not transmit information associated with the change of the MCCH and physical layer information to demodulate and decode MCCH information through system information, the base station 320 may transmit, to the terminal 310, separate scheduling information for a radio resource that transmits the MCCH. Specifically, the base station 320 may reserve and allocate a separate scheduling identifier used for the MBMS, for example, MBMS-Radio Network Temporary Identifier (MBMS-RNTI), used for transmission of MBMS information and physical layer control information, for example, PDCCH.

The base station 320 may transmit, to the terminal, information associated with a sub-frame that transmits the MCCH and an MBMS Traffic Channel (MTCH).

According to an embodiment, the base station 320 may transmit sub-frame allocation information using a single MSAP without separating the MCCH and the MTCH. The base station 320 may include MTCH reception information in the MCCH and may transmit the MCCH including the MTCH reception information to enable the terminal 310 to receive the MTCH through the MCCH.

According to another embodiment, the base station 320 may separate the MCCH from the MTCH and may transmit the sub-frame allocation information using each of their MSAPs.

As a first example, the base station 320 may designate a plurality of transport channels that transmit the MTCH using a single MSAP.

As a second example, the base station 320 may designate a separate MSAP for each transport channel that transmits the MTCH. In this case, the base station 320 may separate each transport channel that transmits the MTCH based on a form of a service or a quality of service (QoS), and may set the separate MSAP that transmits each transport channel.

When the base station 320 is included in a plurality of MBSFN areas, the base station 320 may report, to the terminal 310, that the base station 320 is included in the plurality of MBSFN areas to support each of the plurality of MBSFN areas, using system information or separate physical channel information. In this case, the base station 320 may separate MSAP information that transmits the MCCH for each MBSFN area to transmit the MSAP information, or may designate a sub-frame used for a predetermined MBMS using the same MSAP and may arrange MCCH for the plurality of MBSFN areas in the designated sub-frame to transmit the designated sub-frame.

When the MCCH for the plurality of MBSFN areas is transmitted using the same MSAP, the base station 320 may transmit each MCCH using a separate coded block or using a single unified block. The base station 320 may transmit each MCCH using a different MCCH transmission start point, a different changing period, and a different repetition period.

The base station 320 may transmit a portion of MBMS control information to the terminal 310 using the MTCH.

In operation S340, the terminal 310 receives MCCH using the MCCH information. The terminal 310 may access MBMS radio resource that transmits the MCCH, and may receive the MCCH using radio resource location information and modulation and coding information with respect to the MCCH.

The terminal 310 may access the radio resource that transmits the MCCH based on the physical layer control information using the scheduling identifier used for the MBMS allocated separately from the system information.

When a form of the MBMS service provided by the base station 320 demands a separate joining and release procedure, in operation S350, the terminal 310 transmits an MBMS reception request message to the base station 320. The MBMS reception request message may include a joining request of the terminal 310 with respect to the MBMS service provided by the base station 320. In operation S360, the terminal 310 receives the MTCH from the base station 320 in response to the MBMS reception request message. The MTCH may include MBMS data. When transmitting of the MBMS data is completed, the terminal 310 transmits the MBMS reception release message to the base station 320 in operation S370.

When a form of the MBMS service provided by the base station 320 does not demand a separate joining and release procedure, the terminal 310 may receive the MTCH from the base station 320 in operation S360, without transmitting the MBMS reception request message.

According to an embodiment, in operation S360, the base station 320 performs mapping of the MTCH and the MCCH on the same radio resource to transmit the MTCH and the MCCH to the terminal 310. In this case, the base station 320 may mark an MAC header or a separate field parameter on scheduling information, for example, a channel identifier, for transmission of the MBMS, to enable data and control information to be separated in an MAC layer of the terminal 310.

In a case of the MBSFN operation, to multiplex at least one MBMS data packet information into the same radio resources, a multiplexing process may be performed in an MBMS user plane (UP) of an MBMS GW that controls the base station 320 or a multiplexing process may be performed in a packet data convergence protocol (PDCP) layer when the PDCP layer is introduced. In the case of the MBSFN operation, a terminal that receives MBMS information transmitted from a plurality of base stations may need to recognize the MBMS information as being transmitted from a single transmitter, as opposed to being transmitted from the plurality of base stations.

Figure 4:
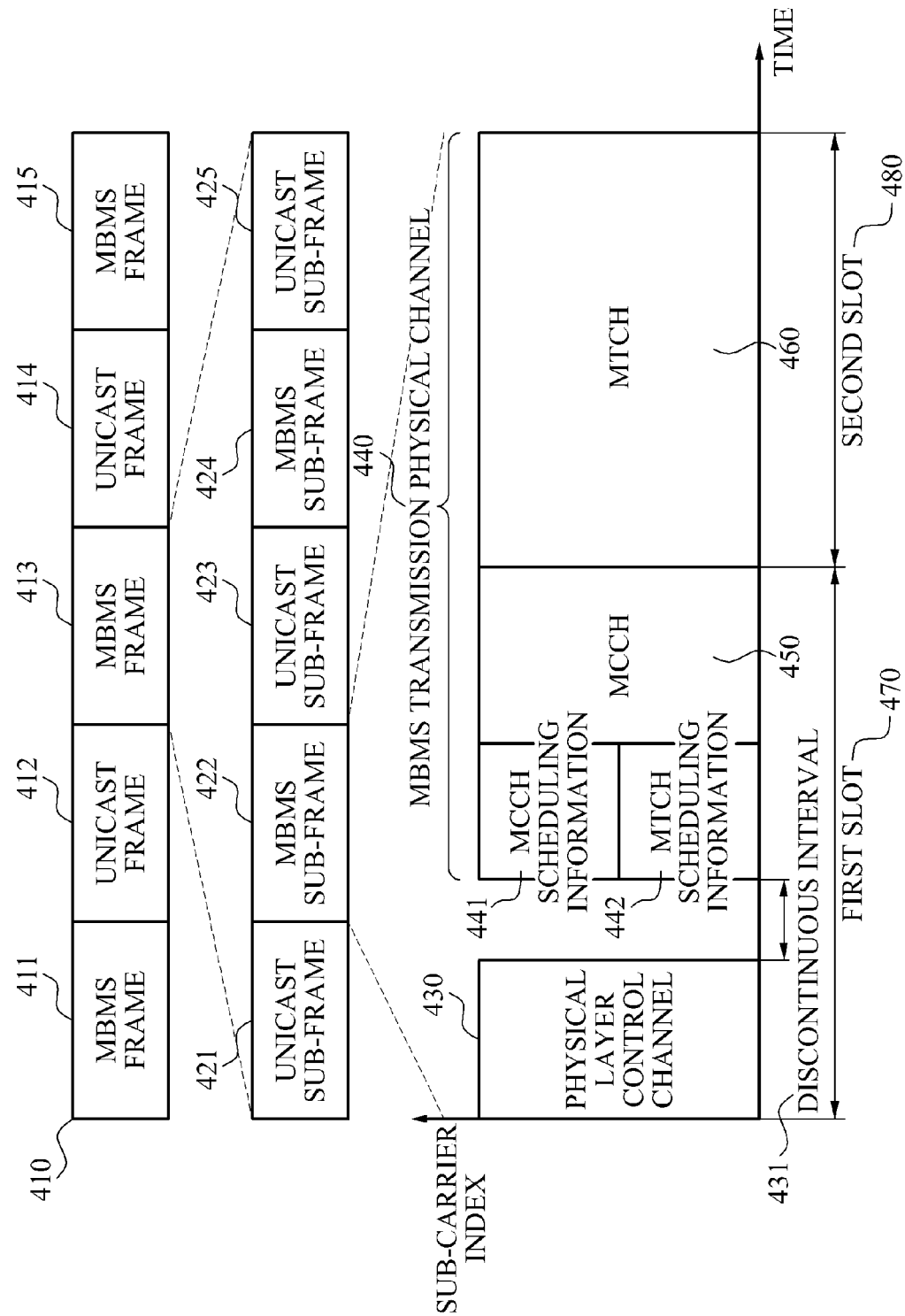
FIG. 4 is a diagram illustrating a structure of a data frame according to an embodiment of the present invention.

FIG. 4 illustrates a structure of a data frame according to an embodiment of the present invention.

According to an embodiment, an MBMS may be provided by an MBMS-dedicated base station managing a dedicated carrier only for the MBMS and combination base stations providing the MBMS and a unicast service in a single cell.

A structure of a frame or a sub-frame for the MBMS in combination cells may be different based on whether a physical layer control channel for the unicast service is utilized.

The frame 410 may be classified, based on MRAP information, into MBMS frames 411, 413, and 415 transmitting MBMS information and unicast frames 412 and 414 transmitting unicast information.

The MBMS frames 411, 413, and 415 may include unicast sub-frames 421, 423, 425 transmitting unicast data and MBMS sub-frames 422 and 424 transmitting MBMS data.

Each of the MBMS sub-frames 422 and 424 and the unicast sub-frames 421, 423, and 425 may include a cyclic prefix (CP). The CP may be constituted based on a symbol unit to correct a delay spread occurring in a radio channel, and a length of the CP may be different based on a coverage of a base station. Therefore, lengths of CPs of the unicast sub-frames 421, 423, and 425 which are only based on a predetermined base station may be different from lengths of CPs of the MBMS sub-frames 422 and 424 which are based on an MBSFN function.

During a time duration where an MBMS sub-frame is transmitted, terminals that receive a unicast service may measure a predetermined parameter or may estimate a state of a downlink based on a reference symbol. In the MBMS sub-frame, the physical layer control channel 430, for example, PDCCH, transmitting physical layer control information may include a CP having the same length as a unicast sub-frame. Therefore, a discontinuous interval 431 may occur between the physical layer control channel 430 and MBMS transmission physical channel 440 in the MBMS sub-frame.

The MBMS transmission physical channel 440 may include MCCH scheduling information 441, MTCH scheduling information 442, MCCH 450, and MTCH 460. In this case, the MTCH scheduling information 441 may indicate location information and radio resource allocation with respect to each MBMS channel (MCH) that transmits the MBMS and modulation and coding information.

When the base station does not transmit the MCCH radio resource location information and the modulation and coding information through system information, the base station may transmit, to the terminal, the MCCH radio resource location information and the modulation and coding information by including the MCCH radio resource location information and the modulation and coding information in the MCCH scheduling information 441. The terminal may receive the MCCH 450 using the MCCH radio resource location information and the modulation and coding information.

The terminal may receive MTCH scheduling information 442 based on the received MCCH 450, and may receive MTCH 460 based on the MTCH scheduling information 442.

Figure 5:
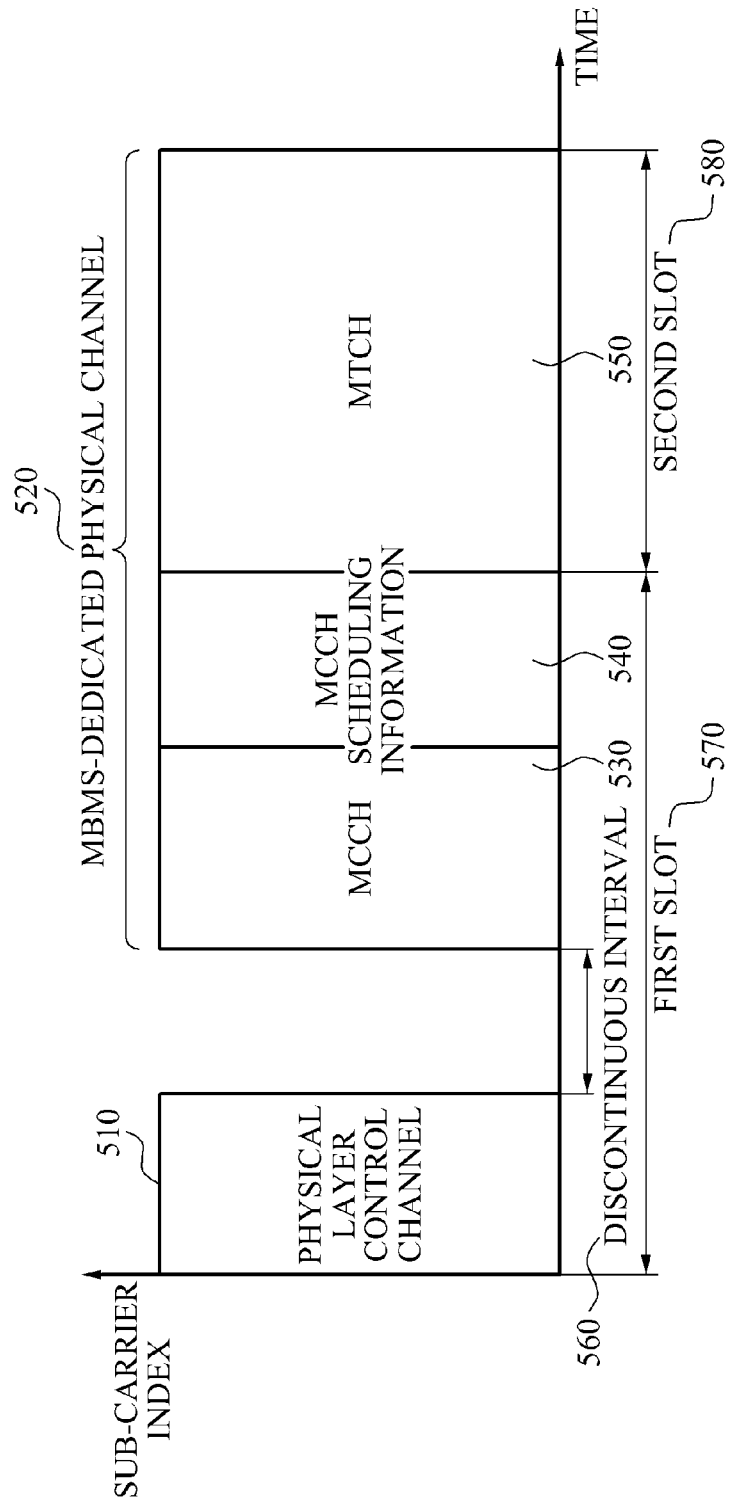
FIG. 5 is a diagram illustrating a structure of a data frame according to another embodiment of the present invention.

FIG. 5 illustrates a structure of a data frame according to another embodiment of the present invention. In FIG. 5, a base station transmits MCCH radio resource location information and modulation and coding information using system information, and an MBMS-dedicated physical channel 520 may not include MCCH scheduling information.

A terminal may receive the MCCH radio resource location information and the modulation and coding information using the system information, and may receive MCCH 530 using the received MCCH radio resource location information and the modulation coding information. The terminal may receive MTCH scheduling information 540 using the MCCH 530, may receive MTCH 550 using the MTCH scheduling information 540. The terminal may receive MTCH scheduling information using a separate indication field parameter or resource allocation information, regardless of the MCCH 530, and may receive the MTCH 550 using the corresponding MTCH scheduling information. As illustrated in FIG. 4 or 5, transmission may be performed in an order of the MTCH scheduling information, the MCCH information, and the MTCH.

Figure 6:
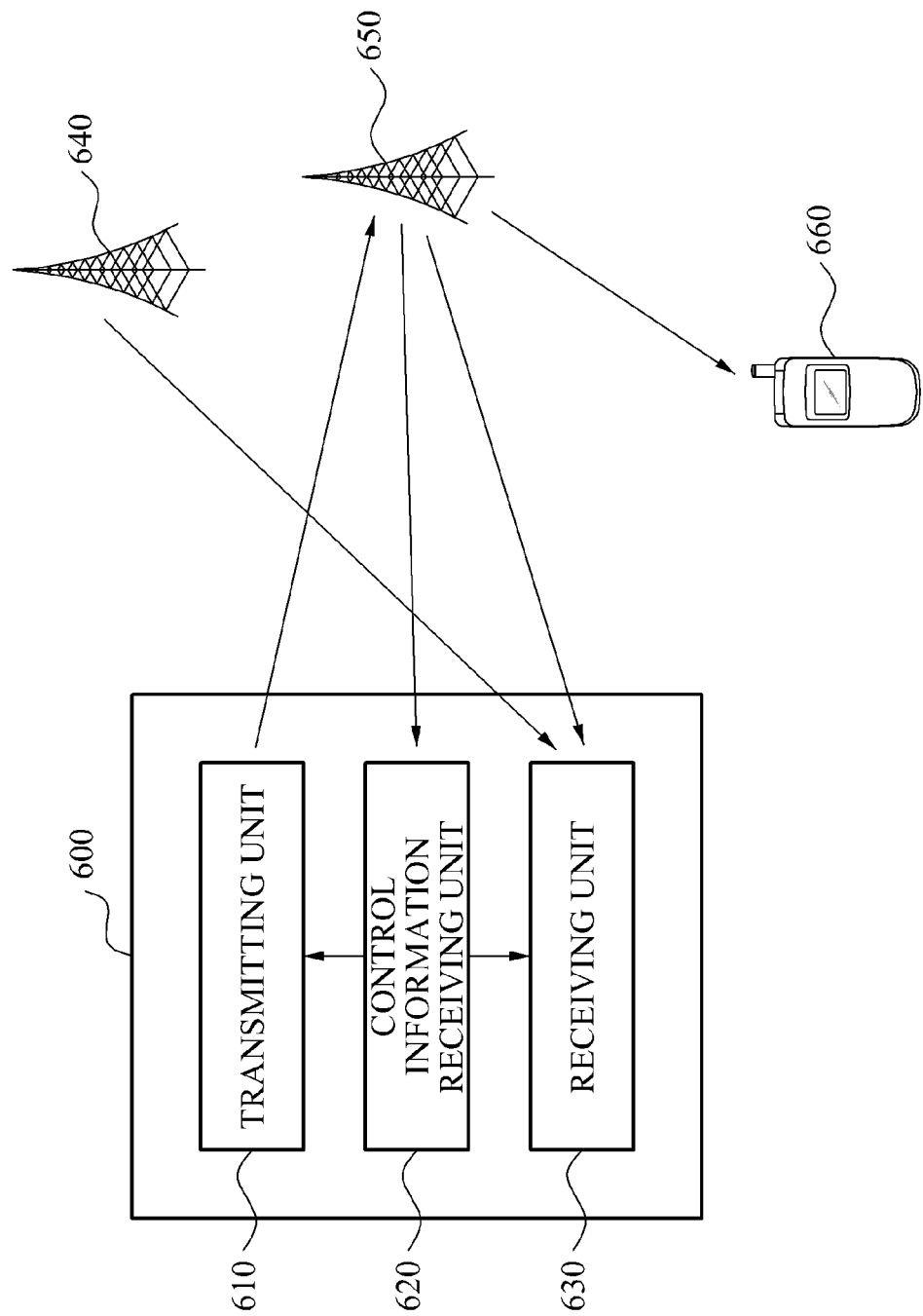
FIG. 6 is a block diagram illustrating a configuration of a terminal according to an embodiment of the present invention.

FIG. 6 illustrates a configuration of a terminal 600 according to an embodiment of the present invention.

The terminal 600 may include a transmitting unit 610, a control information receiving unit 620, and a receiving unit 630.

The control information receiving unit 620 may receive, from a base station 650, information associated with multicast resource allocation. According to an embodiment, the information associated with the multicast resource allocation may be MCCH scheduling information. The control information receiving unit 620 may receive multicast control information based on information associated with the multicast resource allocation. According to an embodiment, the multicast control information may be transmitted based on an MCCH.

According to an embodiment, the multicast control information may include at least one among information associated with whether the base station 650 transmits multicast data, information about whether a second base station 640 adjacent to the base station 650 transmits multicast data, and information associated with an MBSFN operation of the base station 650.

The receiving unit 630 may receive multicast data from the base station 650, based on the multicast control information.

According to an embodiment, the control information receiving unit 620 or the receiving unit 630 may receive, from the base station 650, data or information in a form of a data frame. The data frame may include multicast data or unicast data.

According to an embodiment, each of a data frame including the multicast data and a data frame including unicast data may include a CP. In this case, a length of a first CP included in the data frame including the multicast data may be different from a length of a second CP included in the data frame including the unicast data.

According to an embodiment, the control information receiving unit 620 may receive multicast control information included in the data frame. In this case, information associated with the multicast resource allocation may include information associated with a time where the multicast control information is included in the data frame. The control receiving unit 620 may receive multicast control information based on information associated with the multicast resource allocation, and the receiving unit 630 may receive multicast data based on the multicast control information.

According to an embodiment, the multicast data transmitted by the base station 650 may be applied to a service that demands a joining or a release. In this case, the transmitting unit 610 may transmit, to the base station 650, a multicast join message based on the multicast control information, and the receiving unit 630 may receive the multicast data from the base station 650 in response to the multicast join message. When receiving of the multicast data is completed, the transmitting unit 610 may transmit a multicast release message to the base station 650.

According to an embodiment, the control information receiving unit 620 may receive information associated with the multicast resource allocation or multicast control information included in the system information of the base station 650. According to another embodiment, the control information receiving unit 620 may receive, from the base station 650, the multicast control information or the information associated with the multicast resource allocation using a separate downlink channel.

Figure 7:
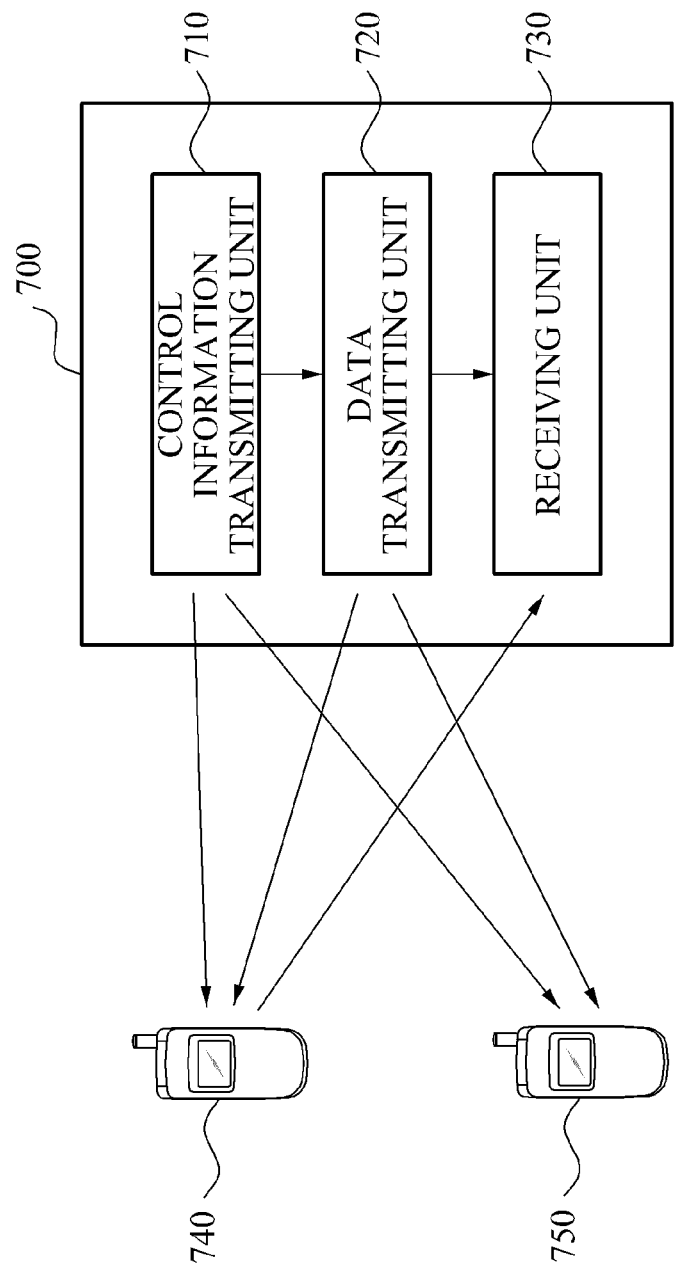
FIG. 7 is a block diagram illustrating a configuration of a base station according to an embodiment of the present invention.

FIG. 7 illustrates a configuration of a base station 700 according to an embodiment of the present invention.

The base station 700 may include a control information transmitting unit 710, a data transmitting unit 720, and a receiving unit 730.

The control information transmitting unit 710 may transmit, to a terminal 740, information associated with multicast resource allocation. According to an embodiment, the information associated with the multicast resource allocation may be information associated with a sub-frame through which an MCCH or an MTCH is transmitted, and may be generated in a form of a pattern.

The control information transmitting unit 710 may transmit, to the terminal 740, multicast control information based on the information associated with the multicast resource allocation. According to an embodiment, the multicast control information may include at least one among information associated with whether the base station 700 transmits multicast data, information associated with whether a second base station adjacent to the base station 700 transmits multicast data, and information associated with an MBSFN operation of the base station 700.

When a layered cell environment is applied, the second base station may be included in the same layer of the base station 700 or included in a different layer from the base station 700.

According to an embodiment, the control information transmitting unit 710 may transmit the multicast control information by including the multicast control information in system information of the base station 700. The terminal 740 may receive the multicast control information included in the system information of the base station 700. When the multicast control information included in the system information is modulated or coded based on a predetermined modulation method or based on a predetermined coding method, a terminal may easily obtain the multicast control information.

The data transmitting unit 720 may transmit, to the terminal 740, the multicast data based on the multicast control information. The terminal 740 may receive the multicast data using the multicast control information.

According to an embodiment, an MBMS provided by the base station 700 may demand a separate joining or release procedure. In this case, the receiving unit 730 may receive, from the terminal 740, a multicast join message based on the multicast control information. The data transmitting unit 720 may transmit, to the terminal 740, the multicast data based on the multicast join message. When transmitting of the multicast data is completed, the receiving unit 730 may receive, from the terminal 740, a multicast release message.

When a form of the MBMS provided by the base station 320 demands a separate joining and release procedure, the terminal 310 transmits an MBMS reception request message to the base station 320 in operation S350. The MBMS reception request message may include a join request of the terminal 310 with respect to the MBMS service provided by the base station 320. The terminal 310 may receive, from the base station 320, an MTCH in response to the MBMS reception request message in operation S360. When transmitting MBMS data is completed, the terminal 310 transmits, to the base station 320, an MBMS reception release message in operation S370.

When the form of MBMS provided by the base station 320 does not demand the separate joining and release procedure, the terminal 310 receives the MTCH from the base station 320 in operation S360 without transmitting the MBMS reception request message.

According to an embodiment, the base station 320 performs mapping of the MTCH and the MCCH on the same radio resource and may transmit the MTCH and the MCCH to the terminal 310. In this case, the base station 320 may mark an MAC header or a separate indication field on scheduling information for MBMS transmission to enable data and control information to be distinguished in an MAC layer of the terminal 310.

According to an embodiment, the control information transmitting unit 810 may transmit the multicast control information by including the multicast control information in a data frame. In this case, multicast resource allocation information may include information associated with a time duration where the multicast control information is included in the data frame. Specifically, the multicast resource allocation information includes at least one among information associated with a transmission start point of the multicast control information or information associated with a length of a time duration where the multicast control information is transmitted, and information associated with a transmission completion point of the multicast control information.

Figure 8:
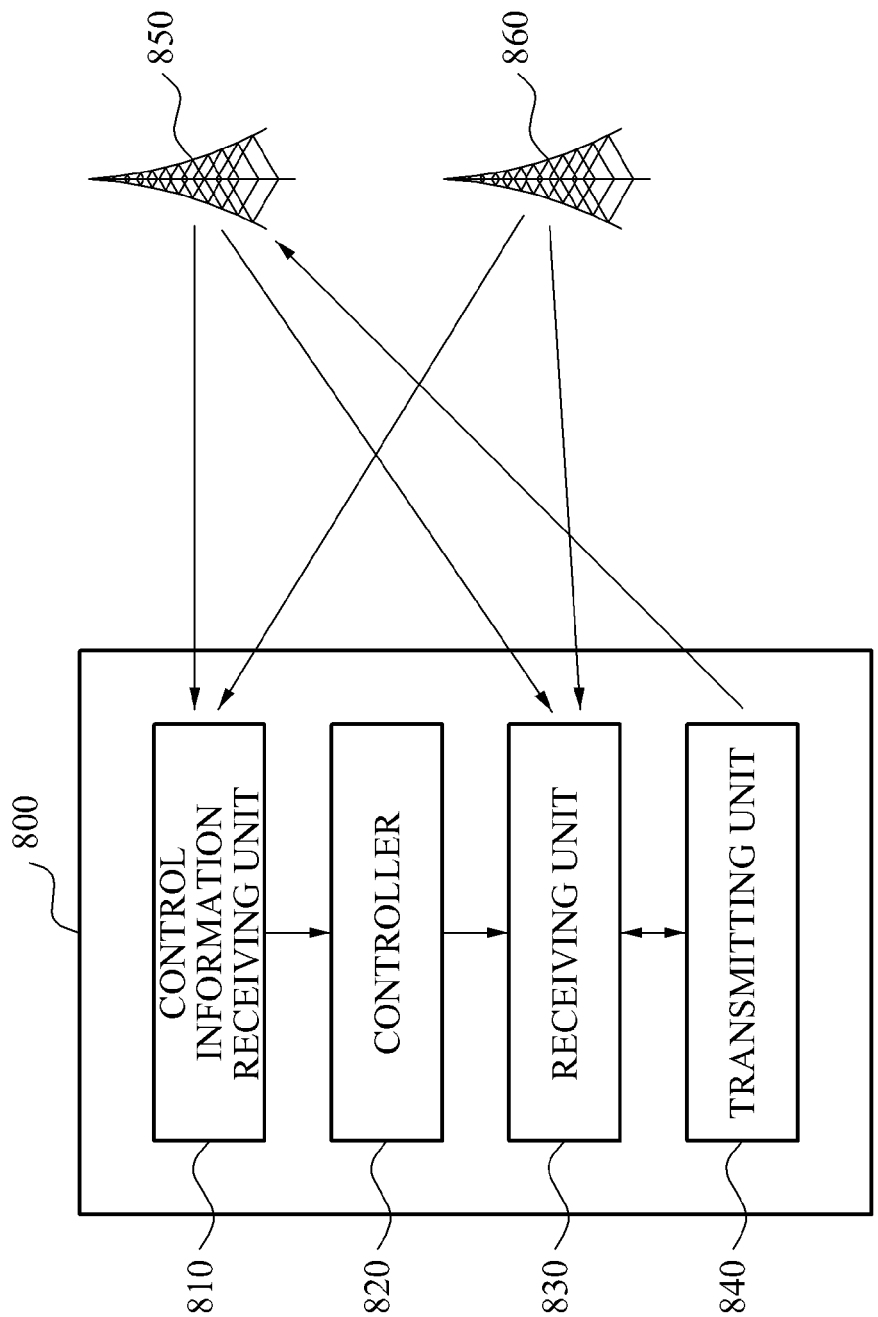
FIG. 8 is a block diagram illustrating a configuration of a terminal according to another embodiment of the present invention.

FIG. 8 illustrates a configuration of a terminal according to another embodiment of the present invention.

The terminal 800 may include a control information receiving unit 810, a controller 820, a receiving unit 830, and a transmitting unit 840.

The control information receiving unit 810 may receive control information with respect to multicast data from the base station 850, which may be referred to as multicast control information. According to an embodiment, the multicast control information may be transmitted using an MCCH. The multicast control information may include information associated with a time duration where the multicast data is transmitted in the data frame. Specifically, information associated with a transmission start point of the multicast data, information associated with a length of the duration where the multicast data is transmitted, information associated with a transmission completion point of the multicast data, and the like may be used as the multicast control information.

The multicast control information may include information regarding whether a multicast service provided by the base station 850 is a service demanding a joining or release procedure or a service that does not demand the joining or release procedure.

The controller 820 may determine the time duration where the multicast data is transmitted in the data frame.

When the multicast service provided by the base station 850 demands the joining or release procedure, the transmitting unit 840 may transmit, to the base station 850, a join request message with respect to the multicast data based on the multicast control information.

The base station 850 may enable the terminal 800 to join the multicast service in response to the join request with respect to the multicast data. The base station 850 may transmit, to the terminal 800, the multicast data corresponding to the multicast service to which the terminal 800 joins, in response to the join message with respect to the multicast data. The base station 850 may transmit, to the terminal 800, the multicast data during a predetermined time duration, based on the multicast control information.

According to an embodiment, the multicast control information and the multicast data may be included in the same data frame and may be transmitted to the terminal 800.

The receiving unit 830 may receive the multicast data from the base station 850 during the time duration determined by the controller 820.

When receiving of the multicast data is completed, the transmitting 840 may transmit a multicast release message to the base station 850.

A small home base station, a relay node, and the like, in addition to a general base station in a conventional mobile cellular system, may be used as the described base station.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of providing, by a base station, a Multimedia Broadcast Multicast Service (MBMS) to a terminal, the method comprising:

transmitting, to the terminal, location information of radio resource used to transmit an MBMS Control Channel (MCCH), modulation and coding information applied to the MCCH, and change information of the MCCH; and transmitting the MCCH to the terminal by using the location information and the modulation and coding information, wherein the MCCH comprises control information associated with MBMS Traffic Channel (MTCH); and wherein, to identify the MCCH and the MTCH mapped within a same sub-frame, a Media Access Control (MAC) header comprises identification information of the MCCH and/or identification information of the MTCH.

2. The method of claim 1, wherein the change information of the MCCH comprises at least one of a repetition period of the MCCH, a changing period of the MCCH, and a changing frame offset of the MCCH.

3. The method of claim 1, further comprising:
transmitting, to the terminal, an MCCH change notification notifying that a change of the MCCH.

4. The method of claim 1, further comprising:
transmitting, to the terminal, an area identifier of an adjacent MBMS Single Frequency Network (MBSFN) adjacent to an MBSFN to which the base station belongs.

5. The method of claim 1, wherein the MCCH and the MTCH are mapped within the same sub-frame and thereby are transmitted to the terminal.

6. A method of receiving, by a terminal, a Multimedia Broadcast Multicast Service (MBMS), the method comprising:

monitoring an MBMS Control Channel (MCCH) change notification notifying a change of the MCCH;

receiving, from a base station, location information of radio resource used to transmit the MCCH, modulation and coding information applied to the MCCH, and change information of the MCCH; and receiving the MCCH, from the base station, based on the location information and the modulation and coding information, wherein the MCCH comprises control information associated with MBMS Traffic Channel (MTCH), and wherein, to identify the MCCH and the MTCH mapped within a same sub-frame, a Media Access Control (MAC) header comprises identification information of the MCCH and/or identification information of the MTCH.

7. The method of claim 6, wherein the change information of the MCCH comprises at least one of a repetition period of the MCCH, a changing period of the MCCH, and a changing frame offset of the MCCH.

8. The method of claim 6, further comprising:
receiving an area identifier of an adjacent MBMS Single Frequency Network (MBSFN) adjacent to an MBSFN to which the base station belongs.

9. The method of claim 6, wherein the MCCH and the MTCH are mapped within the same sub-frame and thereby are transmitted to the terminal.

\* \* \* \* \*